UNITED STATES PATENT OFFICE.

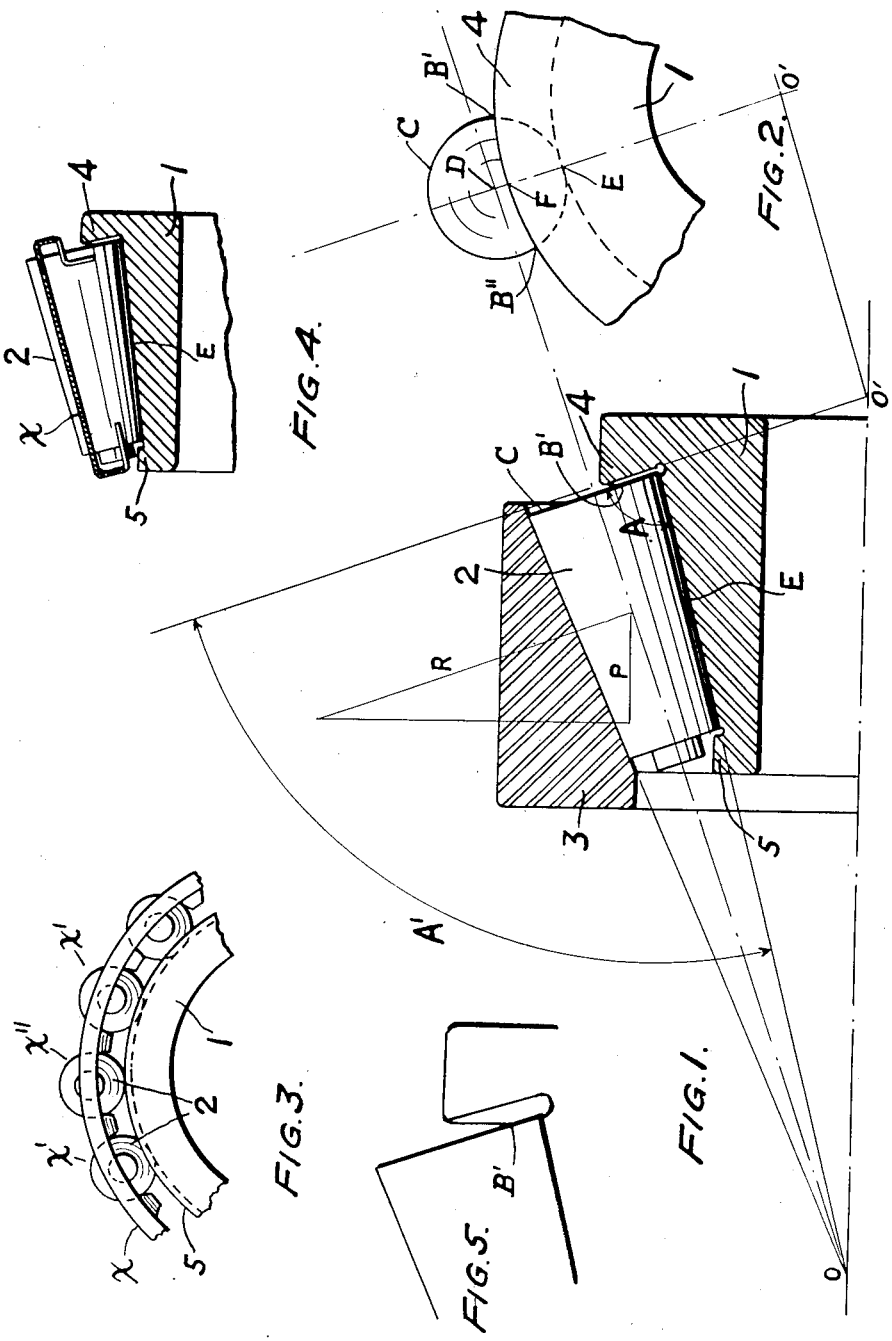

ELMER E. NEAL, OF PHILADELPHIA, PENNSYLVANIA, ASSIGNOR TO MARLIN-ROCKWELL CORPORATION, OF PHILADELPHIA, PENNSYLVANIA, A CORPORATION OF NEW YORK.

TAPER-ROLLER BEARING.

1,258,634.  Specification of Letters Patent.  Patented Mar. 5, 1918.

Application filed June 2, 1917. Serial No. 172,405.

*To all whom it may concern:*

Be it known that I, ELMER E. NEAL, a citizen of the United States, and a resident of Philadelphia, in the county of Philadelphia and State of Pennsylvania, have invented certain new and useful Improvements in Taper-Roller Bearings, of which the following is a specification.

The principal objects of the present invention are to counter-act the disturbing influences which tend to deviate the conical rollers from the mathematically correct direction of their axes and to preserve mathematically pure rolling motion of the rollers in respect to the races; to decrease the total frictional resistance in comparison with known forms of this general type of bearing, and to facilitate the operation of dismantling a cage of rollers and the inner race.

To these and other ends hereinafter set forth the invention, stated in general terms, comprises a reëntrant conical shoulder on the inner cone or race upon the surface of which the circular bases of the rolling cones respectively abut at two separated points only of sliding contact.

The invention will be claimed at the end hereof, but will be described in conection with the embodiment of it chosen for illustration in the accompanying drawings, in which—

Figure 1, is a more or less diagrammatic view, partly in section, illustrating one rolling cone and parts of the inner and outer races or cones, but omitting a cage.

Fig. 2, is a development in end view showing two separated points of sliding contact between the circular base of a rolling cone and the conical reëntrant face of the shoulder.

Fig. 3, is a diagrammatic end view illustrating how, when a cage is used, it and its rolling cones can be removed as a unit from the inner race or cone.

Fig. 4, is a transverse sectional view showing a cage, and

Fig. 5, is a detail view exaggerating features of the invention.

In a taper roller bearing the thrust load, which is applied parallel to the axis of rotation of the bearing, is transformed into radial components which in a properly constructed bearing should act perpendicular to the axes of the conical rolling elements, *e. g.*, the thrust load P which is applied against the cone or inner race 1 of the bearing is transformed into a re-action R, acting perpendicular to the axes of the rollers 2 and becomes felt as a radial pressure within the outer race or cup 3. The requirements for the correct inter-action of the three element, cone, rollers and race, and consequently for the proper functioning of the bearing are:

First:—When the bearing is adjusted for operation the elements of all the conical surfaces of parts 1, 2, and 3 must converge to the same origin O.

Second:—If left unrestrained the rollers 2 will act like wedges, being impelled by the re-action which is exerted upon them by the cone 1 and the race 3 in a direction away from the origin O and in line with their axes. To keep the rollers properly engaged between their races it is necessary to impose restraint against their ends, as by means of the shouldered projection, which in the drawing is shown as an integral portion of the cone 1.

Third:—A cage or spacer is usually provided for the rollers to avoid sliding contact between consecutive rollers and so to avoid undue frictional resistance and noise, but more particularly for the purpose of keeping the axes of the rollers directed to the origin O, or common apex of all the cones.

Practically the cage will not perform this desired function, because it cannot be made to incase the rollers rigidly enough, some clearance being necessary to allow rotation and to permit access of the lubricant. In spite of their cage or container the rollers therefore have some amount of freedom, allowing their axes to deviate to a small extent from their correct direction of intersecting in a common origin. The moment that a roller skews from its proper direction it cannot have elemental line contact with the cone 1 and the race 3. It will theoretically have only point contact with either of these parts because an element of the surface of the roller and an element on the operating surface of the cone 1, both passing through the point of contact between the two parts, will not lie coincident, but will intersect or cross each other.

To counteract any disturbing influences which might tend to deviate the conical rollers from the mathematically correct direction of their axes I have invented a new construction, which has yielded under practical tests the desired pure rolling motion during the inter-action of the conical surfaces of parts 1, 2, and 3, and I will proceed to describe an embodiment of that construction.

I terminate the large diameter ends of the conical rollers 2 by true planes normal to their axes. The rollers 2 therefore become right cones with circular bases. I so shape the shoulder 4 of the cone 1 that the angle $A^1$, is made equal to the angle A of the roller or at least less than a right angle. Thus the surface which the shoulder 4 opposes to the ends of the rollers 2 is that of a hollow cone with apex at $O^1$. The circle C, representing the end of a roller 2, intersects the hollow cone of the shoulder 4 at two points B', B", shown in the end view development, Fig. 2.

The end pressure of the rollers being impelled away from the origin O bears against the two points B', B", which fall on opposite sides of and considerably away from the axis of the roller 2 and its line of contact E with the cone 1. By virtue of the remoteness of the points of contact B', B", from the line of contact E, the pressures acting through these points have a long moment arm, length B' F, which magnifies the influence of the end pressure of the rollers to preserve the equilibrium of the latter. Or, in other words, because the rollers contact with the shoulder 4 at the points B', B", they are prevented from twisting or skewing and their axes always remain directed to the common apex of the elements of the interacting conical surfaces in the bearing.

The circle C revolves through the points B' and B" with sliding motion, but this is not productive of any harmful effect because the pressure at B', B", is very light, but the concomitant advantage of preserving mathematically pure rolling motion over the main conical body of the roller 2 is very great and is the all desired benefit. As a result the total frictional resistance is remarkably decreased over that of any other known form of this general type of taper roller bearing.

At the end of the cone 1, opposite to the shoulder 4, I may provide a shoulder 5, whose function is to make the cage element X and rollers a self-contained unit with the cone 1. It also serves to keep the large diameter ends of the rollers 2 in contact, or very nearly so, with the shoulder 4 at points B', B", should the relative axial displacement of the cone 1 and the race 3 become so disturbed as to allow an excessive amount of end freedom of the bearing.

It is easy to assemble and dismantle the cage of rollers and the cone or inner race, the cage element must be forced over the shoulder 5, when the rollers will snap into their correct position on the cone, from where they cannot be dislodged accidentally. But if the cone and cage assembled upon it are held with the axis of the bearing vertical, the shoulder 5 facing downward, and if the cage of rollers is twirled around swiftly, centrifugal force will disengage the rollers sufficiently from contact with the cone 1 to allow the entire cage element to slip downward over the shoulder 5 and separate entirely from the cone 1.

It will be understood that the rollers 2, have some radial play in the cage, and that while they normally occupy the positions shown at $X^1$, in which they lie between the flanges or shoulders 4 and 5, still they may by reason of this radial play assume the position shown at $X^2$, in which they can pass over the flange 5.

It will be obvious to those skilled in the art that modifications may be made in details of construction and arrangement without departing from the spirit of the invention, but having thus described what I believe to be the best embodiment of my invention, what I claim is:

1. A taper roller bearing provided with concentric co-acting conical uninterrupted surfaces adapted to produce a resultant endwise thrust of its rollers and having a reentrant conical shoulder upon which the circular bases of its rolling cones respectively abut in consequence of said endwise thrust at two separated points only of sliding contact, whereby pure rolling motion over the inner conical race is preserved, substantially as described.

2. A taper roller bearing provided with concentric conical uninterrupted surfaces adapted to produce a resultant endwise thrust of its rollers and having an inner cone provided with a reëntrant conical shoulder of less than 90° with its main rolling surface and upon which the circular bases of its rolling cones respectively abut in consequence of said endwise thrust at two separated points only of sliding contact, whereby pure rolling motion over the inner conical race is preserved, substantially as described.

3. In a taper roller bearing the combination of a circle of rolling cones, a cage in which said cones are afforded play, and an inner cone provided with a shoulder over which the circle of roller-cones can be sprung for assembly and expanded for dis-assembly by centrifugal action induced by rotation of the cage, substantially as described.

ELMER E. NEAL.